(12) United States Patent
Benco et al.

(10) Patent No.: US 7,133,700 B2
(45) Date of Patent: Nov. 7, 2006

(54) WIRELESS VISUAL ALERTING METHOD AND SYSTEM

(75) Inventors: David S. Benco, Winfield, IL (US);
Kevin J. Overend, Elmhurst, IL (US);
Baoling S. Sheen, Naperville, IL (US);
Sandra L. True, St. Charles, IL (US);
Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 440 days.

(21) Appl. No.: 10/411,807

(22) Filed: Apr. 11, 2003

(65) Prior Publication Data

US 2004/0204153 A1    Oct. 14, 2004

(51) Int. Cl.
*H04B 1/38* (2006.01)
*H04M 1/00* (2006.01)

(52) U.S. Cl. ...................... 455/566; 455/567

(58) Field of Classification Search ............ 455/550.1, 455/556.1, 567, 456.1, 456.5, 456.6, 66.1, 455/456.4, 566
See application file for complete search history.

(56) References Cited

U.S. PATENT DOCUMENTS

| | | | | |
|---|---|---|---|---|
| 4,719,647 A * | 1/1988 | Theis et al. | .................... | 379/68 |
| 5,815,800 A * | 9/1998 | Su et al. | ..................... | 340/7.22 |
| 5,950,128 A * | 9/1999 | Ghisler | ..................... | 455/426.1 |
| 6,118,979 A * | 9/2000 | Powell | ........................ | 340/7.6 |
| 6,263,218 B1 * | 7/2001 | Kita | ............................ | 455/567 |
| 6,272,359 B1 * | 8/2001 | Kivela et al. | ............... | 455/567 |
| 6,798,879 B1 * | 9/2004 | Beham | .................. | 379/355.03 |
| 6,862,454 B1 * | 3/2005 | Kanevsky et al. | ....... | 455/456.5 |

* cited by examiner

*Primary Examiner*—Nguyen T. Vo

(57) ABSTRACT

A method and system in a telecommunications network for visually alerting a user of an incoming call are disclosed herein. A call can be transmitted to a mobile device associated with a user of the telecommunications network. An alert can also be transmitted to one or more visual alerting devices associated with the user and/or the mobile device, in response to transmitting a call to the mobile device. A visual alerting signal can then be transmitted via the visual alerting device, in response to transmitting the alert to the at least one visual alerting device associated with the user. Each visual alerting device can provide a visually alerting signal when there is an incoming message for its user. The visual alerting device can receive its signal directly from a base station within said telecommunications network.

21 Claims, 5 Drawing Sheets

WIRELESS VISUAL ALERTING METHOD AND SYSTEM

TECHNICAL FIELD

The present invention relates to wireless telephony in general, and, more particularly, to a method and system for alerting a user to an incoming telephone call and/or other data, such as text messages or e-mail notifications.

BACKGROUND OF THE INVENTION

Wireless telephones, which include both cellular telephones and the higher frequency personal communication devices (PCDs), are growing in numbers and also shrinking in size and weight. The growth in numbers is influenced by the convenience and the per call cost of wireless telephones with respect to pagers and wire line telephones or coin telephones for completing calls, especially when the user is away from home or office. The shrinking size is influenced by two related technologies: more efficient receive/transmit processing circuits and higher power density batteries.

Wireless handsets are more frequently being carried in purses, briefcases, coat pockets where they are away from close contact with the user. As the wireless handset is carried further from the user, the ringing sound and more so the vibrator alerting become less effective. The vibrator-alerting mode is typically used in places where audible alerting would be disruptive, such as meetings or meal times. However, if the vibration is not effective because the handset is in a purse, briefcase or coat, then a call can be missed. So, there is a need in the art for another type of alerting signal for wireless telephones that is non-audible and thus not disruptive.

Some attempts at a non-disruptive alerting use a flashing handset holder or a flashing antenna. These devices by design are located in the immediate proximity of a wireless handset. So, if a wireless handset using a flashing cover or a flashing antenna is located in a purse, briefcase or loosely worn coat pocket, the visual alerting will be just as ineffective as vibrator alerting. Furthermore, these devices do not work for some wireless service providers.

Another attempt at a non-disruptive alerting signal is known from a pen that is worn clipped in a pocket or such and visually alerts the user to an incoming telephone call. This type of pen has usage limited to cellular telephones since it senses the response signal of the wireless handset to trigger its visual alerting. Further, a visual alerting signal may be triggered by someone else's cell telephone handset ringing within a 5 to 7 foot radius. This pen also flashes as it scans for signal. The flashing sequences will vary depending on service and geographic area. The pen will not flash if for all service providers.

Wireless telephones also are growing in functionality. Many wireless telephone handsets have voice-mail and there is an alerting for indicating the receipt of voice mail. Many wireless telephones have short messaging service capabilities. Other wireless telephones can connect to the Internet. And still others can take digital photographs and send the digital photographs to the other party of the telephone call. The present inventors have thus concluded that a need exists for an improved method and system, including devices thereof, which efficiently permit a user to be alerted of an incoming telephone call or receipt of other telecommunications data, such as text messages and/or e-mail. The present inventors believe that the method and system described herein meets this challenge.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide a method and system for alerting a user to an incoming telephone call.

It is another aspect of the present invention to provide a visual alerting method and system utilized in a telecommunications network.

It is yet another aspect of the present invention to provide a visual alerting device for alerting a user to incoming calls and/or messages within the context of a telecommunications network.

It is still a further aspect of the present invention to provide a visual alerting device that is associated with a user and/or a mobile station (e.g., a cellular telephone) within a telecommunications network.

The aforementioned aspects of the invention and other objectives and advantages can now be achieved as will now be summarized. A method and system in a telecommunications network for visually alerting a user of an incoming call are disclosed herein. A call can be transmitted to a mobile device associated with a user of the telecommunications network. An alert can also be transmitted to one or more visual alerting devices associated with the user and/or the mobile device, in response to transmitting a call to the mobile device. A visual alerting signal can then be transmitted via the visual alerting device, in response to transmitting the alert to the at least one visual alerting device associated with the user. Each visual alerting device can provide a visually alerting signal when there is an incoming message for its user. The visual alerting device can receive its signal directly from a base station within said telecommunications network.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
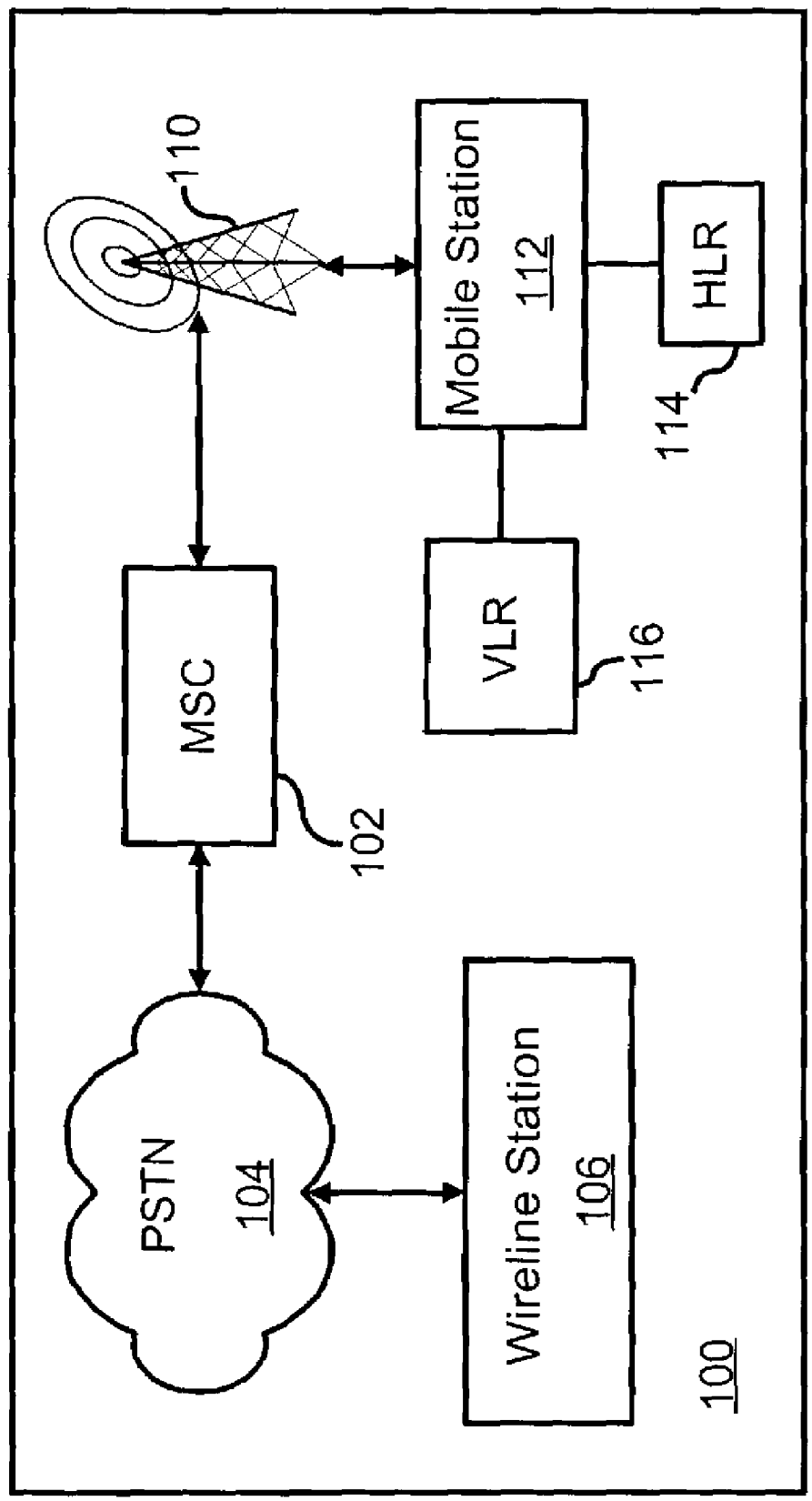
FIG. 1 illustrates a block diagram illustrative of a conventional mobile switching center, base station and mobile stations thereof.

Referring to FIG. 1, a known system 100 for visual remote alerting for mobile handsets is shown. System 100 has a mobile switching center (MSC) 102. A public switched telephone network (PSTN) 104 is connected to MSC 102. PSTN 104 routes calls to and from mobile users through MSC 102, and routes calls from and to wireline stations 106. MSC 102 is also connected to one or more base stations (BS) 110. Each of the base stations 110 communicates with mobile station(s) 112 in its service area. PSTN 104 generally can be implemented as the worldwide voice telephone network accessible to all those with telephones and access privileges (e.g., AT&T long distance network).

Each of the mobile stations 112 has a home location register (HLR) 114 where data about each of the mobile stations 112 resides. Some of the mobile stations 112 maybe remotely located from their home location, and in that case, a visiting location register (VLR) 116 is set up locally for each mobile station 112 that is visiting in its service area. HLR 114 can be implemented as a permanent SS7 database utilized in cellular networks, such as, but not limited to, for example, AMPS (Advanced Mobile Phone System), GSM (Global System for Mobile Communications), and PCS.

HLR 114 can be utilized generally to identify/verify a subscriber, and also contains subscriber data related to features and services. HLR 114 is generally utilized not only when a call is being made within a coverage area supported by a cellular provider of record, but also to verify the legitimacy and to support subscriber features when a subscriber is away from his or her home area. VLR 116, on the other hand, can be implemented as a local database maintained by the cellular provider whose territory is being roamed. Mobile station 112 can be implemented as a cellular device, personal communication device, short message service device or wireless communications device (e.g., a wireless personal digital assistant).

Figure 2:
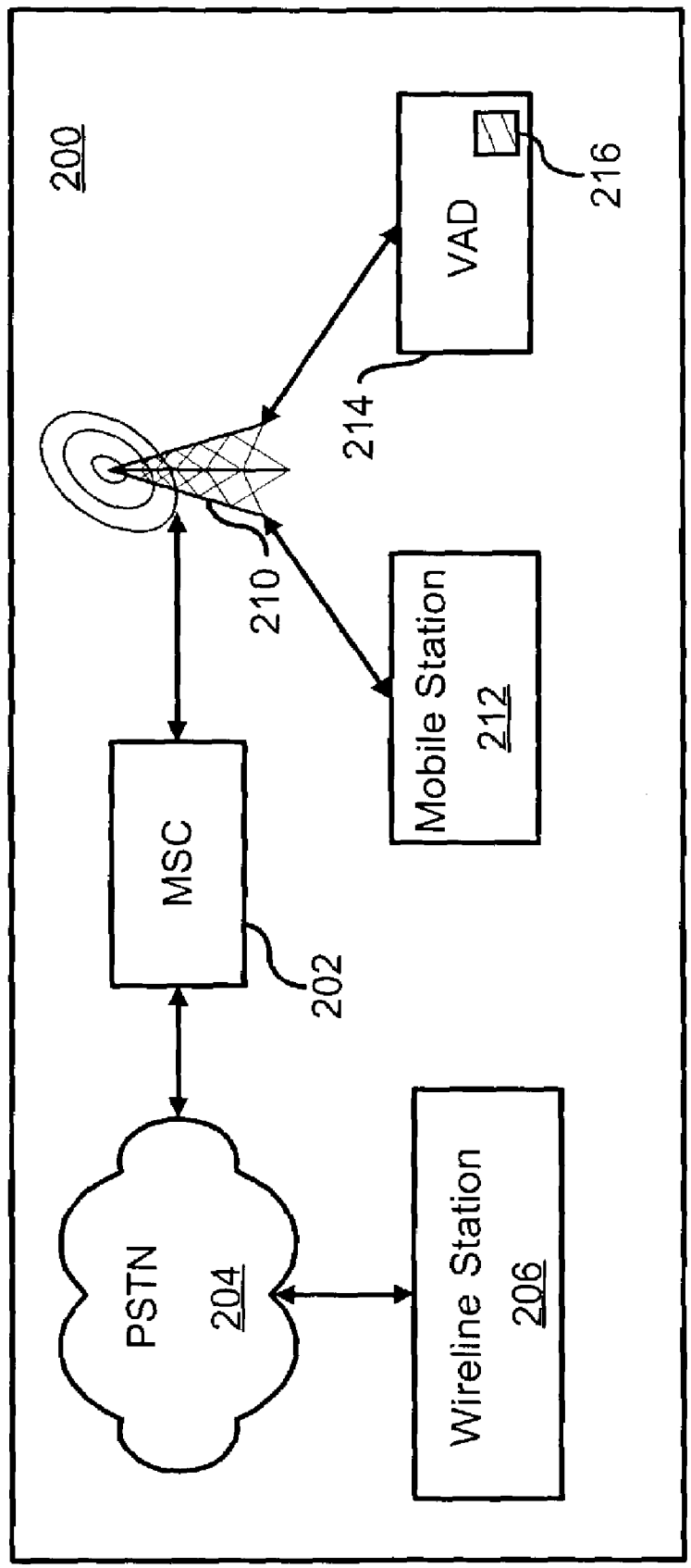
FIG. 2 illustrates a block diagram illustrative of a mobile switching center, base station, mobile station and a visual alerting device according to a preferred embodiment of the present invention.

FIG. 2 illustrates a block diagram illustrative of a mobile switching center 202, base station 210, mobile station 212 and a visual alerting device 214 according to a preferred embodiment of the present invention. Referring to FIG. 2, a system 200 for visual remote alerting for mobile handsets is shown. System 200 includes mobile switching center (MSC) 202. A public switched telephone network (PSTN) 204 is generally connected to MSC 202. PSTN 204 routes calls to and from mobile users through MSC 202, and routes calls from and to wireline stations 206. MSC 202 is connected to one or more base stations 210. The base station(s) 210 communicates through the air to mobile stations, which may be of a cellular telephone type or of the wider bandwidth personal communication device type. Mobile stations 212 are wireless handsets or automobile mounted stations the same as those shown in FIG. 1.

New visual alerting device VAD 214 is also shown in FIG. 2. VAD 214, like mobile stations, may take on various forms. A pen shaped VAD 214 can be worn in a pocket or placed on a surface in view of the user. A bracelet or watch-shaped VAD 214, for example, can be worn on the wrist, which often is in view of the wearer. VAD 214 can be configured small because the general purpose of the device is to provide a visual alerting signal when a message of some sort is attempting to get through to a user. VAD 214 also does not require speakers or microphones because the device does not communicate by sound or speech. VAD 214 does not require keypads because such a device does not dial numbers or send text messages. In fact, VAD 214 does not have to have transmitters just receivers; however, some VAD can be provided with transmitters as explained in further detail herein.

Each VAD can be provided with a visual alerting indicator 216 that can be implemented, for example, via a liquid crystal indicator. Liquid crystal indicators take the least power, but are difficult to notice, especially in low light conditions. Light emitting diodes, laser diodes and incandescent bulbs can also be utilized and the trade off for the light emitters is brightness versus battery life. This simple design lends itself to small, lightweight devices and efficient use of battery life. VAD 214 can be configured to include a housing for maintaining the VAD, such that the VAD 214 is associated with a particular telecommunications network user. VAD 214 is generally maintained with the housing, such that an alert is transmitted to VAD 214 in response to transmission of a call or other data (e.g., text or e-mail messages) to mobile station 212. Visual alerting indicator 216 can be integrated with the housing to automatically provide an alerting signal in response to transmission of an alert to VAD 214.

Each VAD 214 can provide a visually alerting signal when there is an incoming message for its user. The VAD receives its signal directly from the base station 210. In one embodiment of the invention, the VAD is purchased set with the same identification number as the mobile station for which it provides the visual alerting. In such an embodiment, the VAD 214 can be stimulated into visual alerting by the same initial set up message the mobile station 212 would receive if the VAD were not present.

Figure 3:
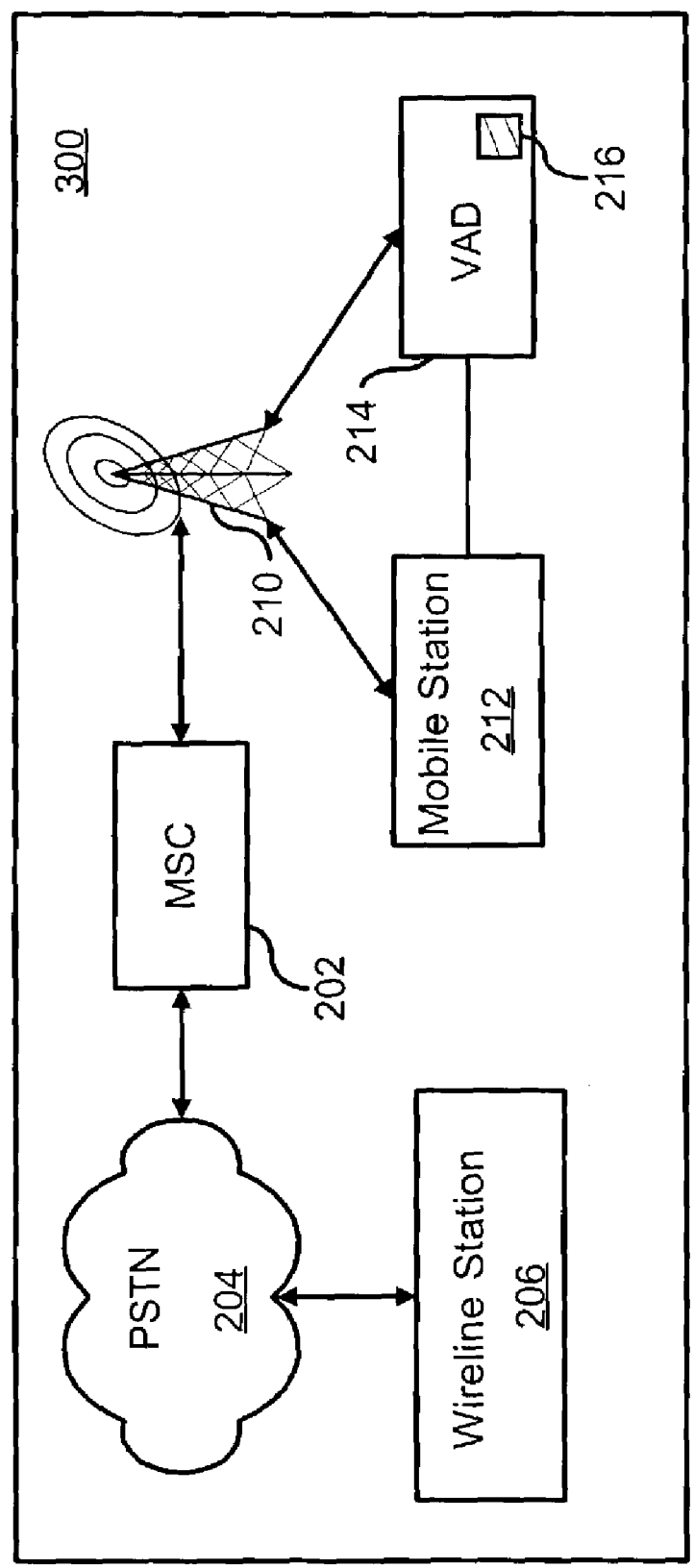
FIG. 3 illustrates a block diagram illustrative of a mobile switching center, base station, mobile station and a visual alerting device according to an alternative embodiment of the present invention.

FIG. 3 illustrates a block diagram illustrative of MSC 202, base station 210, mobile station 212 and VAD 214 according to an alternative embodiment of the present invention. Note that in FIGS. 2–3, like or analogous parts are indicated by identical reference numerals. Thus, FIG. 3 illustrates a system 300 in which each VAD 214 is generally associated with the mobile station 212 for which it provides alerting. In the alternative embodiment depicted in FIG. 3, VAD 214 can be configured with its own identification number. The VAD identification number can be recorded in the user profile in a data field, and in some cases a flag is set, to inform the base station where the mobile station is located that a VAD may be used in conjunction with the mobile station to alert the user to an incoming call.

For example, if a user has his or her mobile station 212 in ON mode, the mobile station will be logged in to the local base station. Base station 210 looks up the user's profile to learn that the user also uses a VAD. Thus, when a call is initially transmitted to the user's mobile station 212 with the mobile station's identification number, a second transmission can also be made to the user's VAD 214, which is associated with the identification number of VAD 214. Therefore, even if the mobile station is in a "no-ring" and/or "no-vibrate" mode, VAD 214 can alert the user to the presence of a message.

In another embodiment of the present, VAD 214 can alert the user of a message from the base station even if the mobile station is turned OFF. If the associated mobile station is turned OFF, the mobile station's last known location is assumed to be present location and in such a case the base station of the mobile station's last location transmits to the associated VAD that there is a call or a message for the user. The transaction does not have to be a voice call, it could be a short text message, a voice mail, etc and the base station will transmit a signal for VAD alerting. Where there are multiple types of messages that can be transmitted to a user's mobile station, multiple alerting patterns may be used so the user can differentiate between a voice call, a voice message, or a text message. Such patterns include constant ON, slow flashing, and fast flashing. The base station either times out the transmission for VAD alerting and turns the transmitting OFF, or the base station turns OFF the transmission for VAD alerting when the associated mobile station becomes active and receives the call or message.

Figure 4:
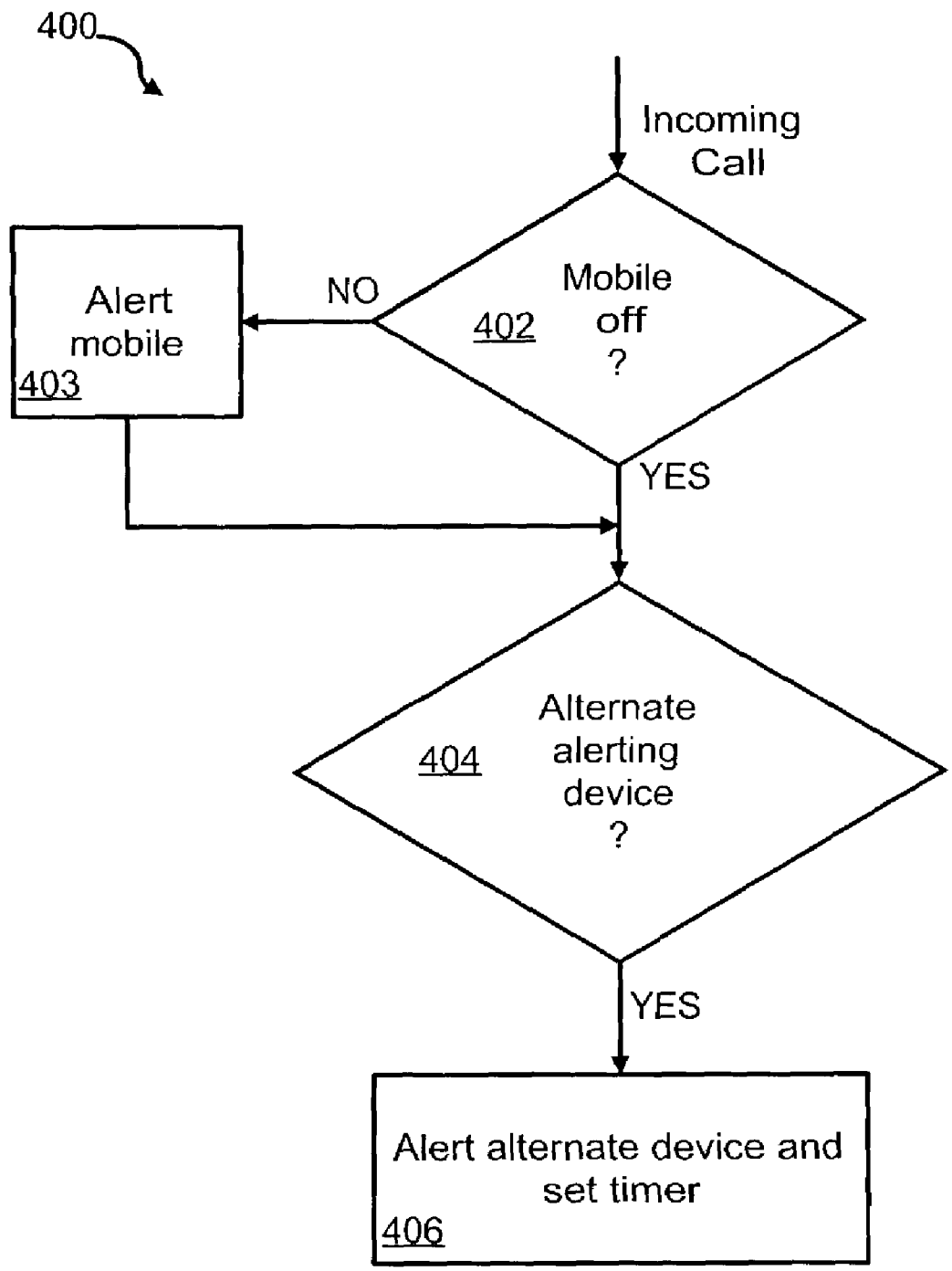
FIG. 4 illustrates a flow chart of logical operational steps that can be followed in accordance with a preferred embodiment of the present invention.

FIG. 4 illustrates a flow chart 400 of logical operational steps that can be followed in accordance with a preferred embodiment of the present invention. As indicated at decision block 402, an incoming call is attempted to be delivered to a mobile device. If the mobile device is on, then the mobile device (e.g., mobile station 212 of FIG. 2) is alerted in the usual manner, as indicated at block 403. Independent of the on/off state of the mobile handset, the operation described at block 404 is processed, in which an alternative device may be alerted. Such an alternative alerting device can be implemented, for example, as VAD 214 of FIG. 2 or 3. If it is determined to alert the alternative alerting device (i.e., the database lookup indicates the alternate alerting device option for this subscriber is active), then as indicated at block 405, the alternative device is alerted and the VAD alerting duration timer is set.

Figure 5:
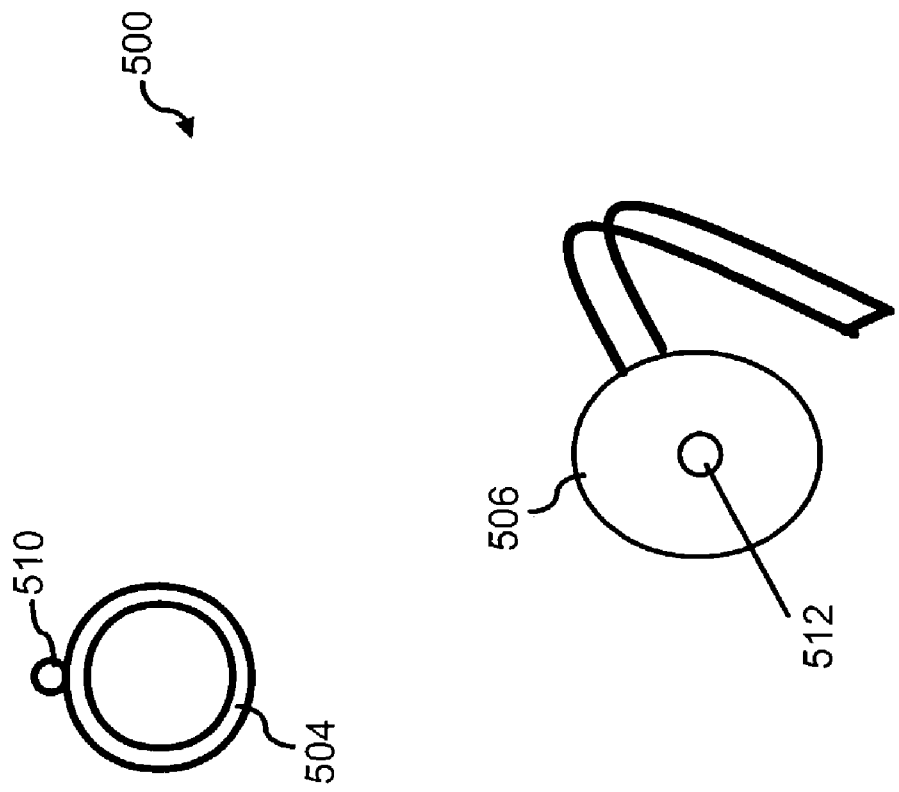
FIG. 5 illustrates implementations of a visual alerting device, in accordance with varying embodiments of the present invention.

FIG. 5 illustrates implementations 500 of a visual alerting device, in accordance with varying embodiments of the present invention. FIG. 5 depicts a visual alerting device in the form of a bracelet 502 that includes a visual alerting indicator 508. FIG. 5 also includes a visual alerting device in the form of a ring 504, which includes a visual alerting indicator 510. Additionally, FIG. 5 depicts a visual alerting device in the form of a clip 506, which includes a visual alerting indicator 512. Note that visual alerting indicators 508, 510 and 512 are analogous to visual alerting indicator 216 of FIG. 2.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A method in a telecommunications network for visually alerting a user of an incoming call, said method comprising the steps of:

transmitting a call to a mobile device associated with a user of said telecommunications network;

transmitting an alert to at least one visual alerting device associated with said user, in response to transmitting a call to said mobile device; and automatically providing a visual alerting signal via said at least one visual alerting device, in response to transmitting said alert to said at least one visual alerting device associated with said user, wherein said at least one visual alerting device communicates without sound, and wherein the visual alerting signal has multiple alerting patterns to differentiate between a voice call, a voice message, or a text message, and wherein the multiple alerting patterns are limited to patterns generated via a light source.

2. The method of claim 1 wherein the step of transmitting an alert to at least one visual alerting device associated with said user, in response to transmitting a call to said mobile device, further comprises the step of:

transmitting said alert to said at least one visual alerting device associated with said user, in response to transmitting said call to said mobile device if said mobile device associated with said user is off.

3. The method of claim 1 further comprising the step of: associating said at least one visual alerting device with said mobile device.

4. The method of claim 1 further comprising the step of: integrating said at least one visual alerting device with said mobile device.

5. The method of claim 1 wherein the step of automatically providing a visual alerting signal via said at least one visual alerting device, in response to transmitting said alert to said at least one visual alerting device associated with said user, further comprises the step of:

providing said visual alerting signal via said at least one visual alerting device based on a last known location of said mobile station relative to at least one base station of said telecommunications network.

6. The method of claim 1 further comprising the steps of:

configuring said at least one visual alerting device with a unique identification number;

recording said unique identification number in a user profile associated with said user; and informing at least one base station associated with said telecommunications network of said unique identification number in order to assist said at least one base station in locating said at least one visual alerting device in association with a call transmitted to said mobile station associated with said user.

7. The method of claim 1 further comprising the step of: associating a liquid crystal indicator with said at least one visual alerting device for visual alerting thereof.

8. The method of claim 1 further comprising the step of associating a light emitting diode with said at least one visual alerting device for visual alerting thereof.

9. The method of claim 1 further comprising the step of: associating a laser diode with said at least one visual alerting device for visual alerting thereof.

10. The method of claim 1 wherein the multiple alerting patterns include constant ON, slow flashing, and fast flashing patterns.

11. A method in a telecommunications network for visually alerting a user of an incoming call, said method comprising the steps of:

associating at least one visual alerting device with a mobile device associated with a user of said telecommunications network;

configuring said at least one visual alerting device with a unique identification number;

recording said unique identification number in a user profile associated with said user;

informing at least one base station associated with said telecommunications network of said unique identification number in order to assist said at least one base station in locating said at least one visual alerting device in association with a call transmitted to said mobile station associated with said user;

transmitting an alert to said at least one visual alerting device associated with said user, in response to transmitting a call to said mobile device, if said mobile device associated with said user is off; and automatically providing a visual alerting signal via said at least one visual alerting device, in response to transmitting said alert to said at least one visual alerting device associated with said user, wherein said at least one visual alerting device communicates without sound, and wherein the visual alerting signal has multiple alerting patterns to differentiate between a voice call, a voice message, or a text message, and wherein the multiple alerting patterns are limited to patterns generated via a light source.

12. A system in a telecommunications network for visually alerting a user of an incoming call, said system comprising:

at least one visual alerting device associated with said user with said telecommunications network, wherein an alert is transmitted to said at least one visual alerting device in response to transmitting a call to a mobile device associated with said user; and a visual alerting signal automatically provided via said at least one visual alerting device, in response to transmitting said alert to said at least one visual alerting device associated with said user, wherein said at least one visual alerting device communicates without sound, and wherein the visual alerting signal has multiple alerting patterns to differentiate between a voice call, a voice message, or a text message, and wherein the multiple alerting patterns are limited to patterns generated via a light source.

13. The system of claim 12 wherein said alert is transmitted to said at least one visual alerting device associated with said user, in response to transmitting said call to said mobile device if said mobile device associated with said user is off.

14. The system of claim 12 wherein said at least one visual alerting device is associated with said mobile device.

15. The system of claim 12 wherein said at least one visual alerting device is integrated with said mobile device.

16. The system of claim 12 wherein said visual alerting signal is provided via said at least one visual alerting device based on a last known location of said mobile station relative to at least one base station of said telecommunications network.

17. The system of claim 12 wherein:

said at least one visual alerting device is configured with a unique identification number;

said unique identification number is recorded in a user profile associated with said user; and at least one base station associated with said telecommunications network is informed of said unique identification number in order to assist said at least one base station in locating said at least one visual alerting device in association with a call transmitted to said mobile station associated with said user.

18. The system of claim 12 further comprising:

a liquid crystal indicator associated with said at least one visual alerting device for visual alerting thereof.

19. The system of claim 12 further comprising:

a light emitting diode associated with said at least one visual alerting device for visual alerting thereof.

20. The system of claim 12 further comprising the step of:

a laser diode associated with said at least one visual alerting device for visual alerting thereof.

21. A visual alerting device for use in a telecommunications network, said visual alerting device comprising:

a housing for maintaining a visual alerting device associated with a user with said telecommunications network;

a visual alerting device maintained with said housing, wherein an alert is transmitted to said visual alerting device in response to transmitting a call to a mobile device associated with said user, and wherein said visual alerting device communicates without sound, and wherein the multiple alerting patterns are limited to patterns generated via a light source; and a visual alerting indicator integrated with said housing, wherein said visual alerting indicator automatically provides an alert via said visual alerting device, in response to transmitting said alert to said visual alerting device associated with said user, and wherein the alert has multiple alerting patterns to differentiate between a voice call, a voice message, or a text message.

* * * * *